United States Patent
Chambers

[11] Patent Number: 5,553,417
[45] Date of Patent: Sep. 10, 1996

[54] FLUID DISTRIBUTION PANEL AND METHOD

[76] Inventor: John E. Chambers, P.O. Box 6747, Greenville, S.C. 29606

[21] Appl. No.: 429,081

[22] Filed: Apr. 26, 1995

Related U.S. Application Data

[63] Continuation-in-part of Ser. No. 973,535, Nov. 9, 1992, abandoned, which is a continuation of Ser. No. 842,748, Feb. 27, 1992, which is a continuation of Ser. No. 631,769, Dec. 24, 1990, which is a continuation of Ser. No. 385,922, Jul. 25, 1989, which is a continuation of Ser. No. 195,451, May 12, 1988, which is a continuation of Ser. No. 889,592, Jul. 25, 1986, which is a continuation of Ser. No. 616,498, Jun. 4, 1984.

[51] Int. Cl.6 ........................................... A01G 9/02
[52] U.S. Cl. ................................. 47/60; 454/190
[58] Field of Search ................... 454/52, 190, 296, 454/906, 131; 47/17 EC, 60 EC

[56] References Cited

U.S. PATENT DOCUMENTS

| | | | |
|---|---|---|---|
| 1,685,701 | 9/1928 | Blanchard | 454/906 |
| 1,783,276 | 12/1930 | Bliss | 454/906 |
| 1,926,795 | 9/1933 | Sassenberg | 454/331 |
| 2,017,306 | 10/1935 | Cove II | 454/331 |
| 3,124,903 | 3/1964 | Truhan | 47/17 |
| 3,159,090 | 12/1964 | Schutt | 454/296 |
| 3,303,771 | 2/1967 | Nesher | 454/296 |
| 3,308,586 | 3/1967 | Olson | 454/296 |
| 3,315,585 | 4/1967 | Hawkins | 454/296 |
| 3,776,121 | 12/1973 | Truhan | 454/190 |
| 4,876,949 | 10/1989 | Fairchild | 454/296 |

FOREIGN PATENT DOCUMENTS

| | | | |
|---|---|---|---|
| 63356 | 4/1945 | Denmark | 454/296 |
| 3435602 | 7/1986 | Germany | 454/296 |
| 8802855 | 6/1990 | Netherlands | 454/52 |

OTHER PUBLICATIONS

Fluid Flow Section 406 "Ducts With Expanding Cross Section (Diffusers)", Tan 10, 1955 p. 3–13.

Primary Examiner—Henry E. Raduazo
Attorney, Agent, or Firm—Ralph Bailey

[57] ABSTRACT

A fluid distribution panel (A) is illustrated, especially for use in a growth chamber, utilizing a plurality of spaced conical surfaces (B) which taper outwardly from a plenum into an enlarged fluid discharge opening for controlling the distribution of air across the plenum with minimal pressure drop or variation.

9 Claims, 3 Drawing Sheets

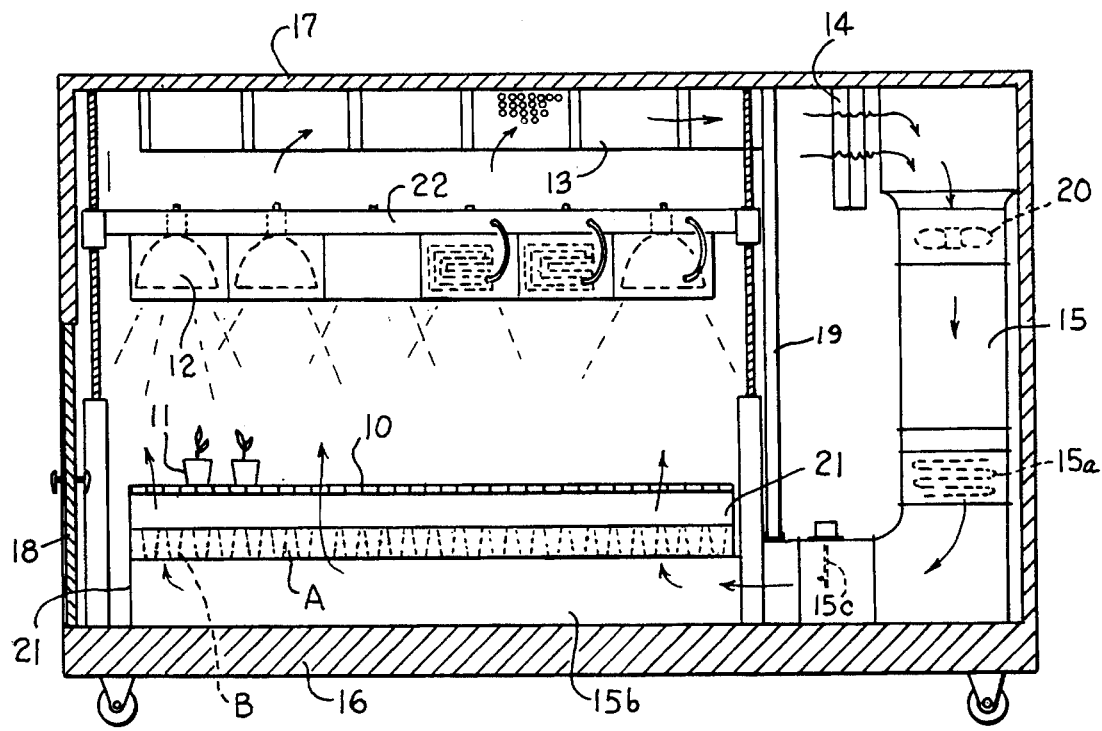
Fig. 1.
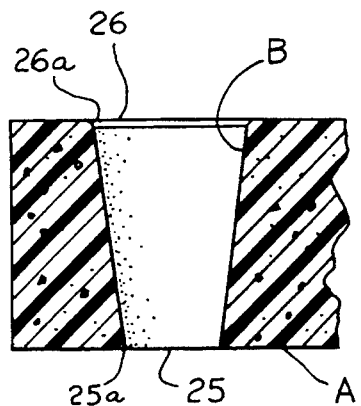
Fig. 2.
Fig. 3.

5,553,417

FLUID DISTRIBUTION PANEL AND METHOD

This application is a continuation-in-part of Ser. No. 07/973,535, filed Nov. 9, 1992, abandoned, which is a continuation of Ser. No. 07/842,748 filed Feb. 27, 1992, which is a continuation of Ser. No. 07/631,769 filed Dec. 24, 1990, which is a continuation of Ser. No. 07/385,922 filed Jul. 25, 1989, which is a continuation of Ser. No. 07/195, 451, filed May 12, 1988, which is a continuation of Ser. No. 06/889,592 filed Jul. 25, 1986, which is a continuation of 06/616,498 filed Jun. 4, 1984.

BACKGROUND OF THE INVENTION

Diverging conical nozzles have been used individually as diffusers or as turbine nozzles and the like.

To distribute air across an enlarged area, such as required in growth chambers and the like, it is customary to utilize a panel having holes spaced across the panel. Whether holes or other nozzles are provided in the panel, it is desirable that air be distributed in a predetermined pattern, usually as uniformly as possible from one end of the panel to the other. Air flow should preferably be laminar over a relatively large area across the panel. Should openings of equal size and spacing be employed in the panel, the pressure drop causes the air flow to diminish from one end of the panel extending across the supply plenum to the other. It is desirable, therefore, to control the flow of air so as to equalize its flow across the entire plenum by minimizing the pressure drop and by minimizing turbulence, preferably producing flow in the laminar region or at least smooth flow in a region of minimized turbulence. A growth chamber, capable of utilizing a panel of the type illustrated herein, is described in U.S. Pat. No. 3,124,903.

Accordingly, it is an important object of this invention to provide an air distribution panel wherein fluid distribution may be controlled through nozzles spaced across the entire panel or manifold with minimal pressure drop. It is possible to vary the size and pattern of the conical, diverging discharge openings and vary the distribution from area to area across a plenum.

SUMMARY OF THE INVENTION

It has been found that a fluid distribution panel may be constructed utilizing a grid containing closely spaced individualized conical members having the small end opening into a plenum or utilizing a block of construction material such as air entrained material as an expanded polyurethane foam wherein the spaced conical surfaces taper outwardly into an enlarged fluid discharge opening resulting in minimized pressure drop with reduced turbulence and uniform, high volume air flow across a wide area of the panel.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a sectional side elevation of a growth chamber equipped with an air distribution panel constructed in accordance with the present invention;

FIG. 2 is an enlarged perspective view illustrating an air distribution panel constructed of expanded polyethylene and the like;

FIG. 3 is an enlarged sectional elevation taken on the line 3—3 in FIG. 2;

DESCRIPTION OF A PREFERRED EMBODIMENT

Figure 4:
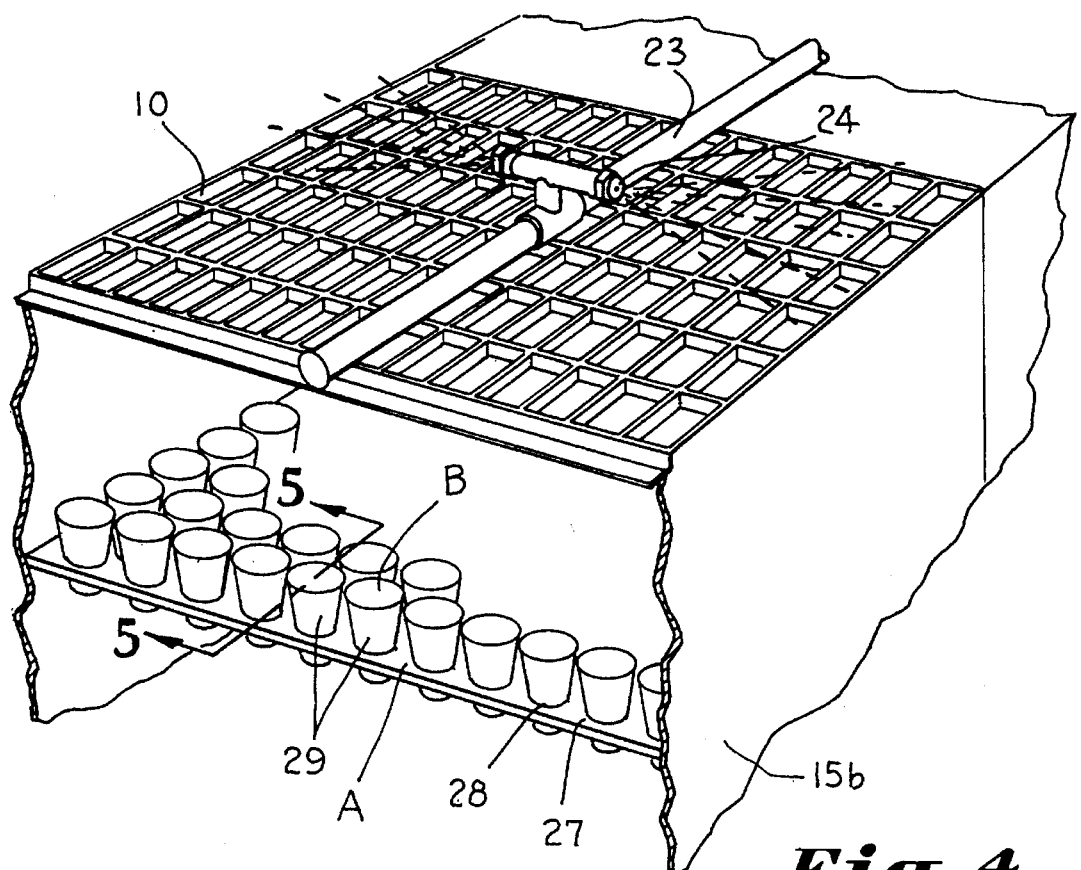
FIG. 4 is a perspective view illustrating a modified form of panel in a growth chamber environment.

The drawings illustrate a fluid distribution panel A for use in a fluid distribution plenum. A plurality of spaced openings in the panel are formed by a plurality of spaced conical surfaces B tapering outwardly in an ever increasing cross section. A portion of each of the conical surfaces open into the plenum and taper outwardly into an enlarged fluid discharge opening. Thus, turbulence in a fluid flowing from the source is reduced resulting in a minimized pressure drop across a boundary formed by the distribution panel. Preferably the conical surfaces have an included angle of about 6° to about 20°.

The drawings further illustrate a growth chamber having a foraminous table 10 for circulating heated air upwardly therethrough and past plants 11 carried on the table and thence through a source of heat and light such as provided by the light fixtures 12. The air then flows through a receiving plenum 13 and a velocity reduction means 14 into a plenum 15 containing coils 15a for heating and cooling and which extends as at 15b beneath and across the table 10. A suitable humidifier 15c and other conditioning and control means are provided as desired depending upon the requirements for the growth chamber. The panel is illustrated at A containing a plurality of spaced openings therein formed by a plurality of spaced, smooth conical surfaces B which taper outwardly in an ever increasing cross section. The lower portion of each of the conical surfaces opens into the plenum and tapers outwardly into an enlarged fluid discharge opening. Thus, turbulence in the air flowing across the table is reduced resulting in a minimized pressure drop with control of air flow uniformly across all areas of the table.

Referring more particularly to FIGS. 1 and 4, the growth chamber is illustrated as including a base 16 carrying an insulated housing 17. The growth chamber has a door 18 therein for access by workers into the interior of the growth chamber, and is partitioned as at 19 providing a compartment for carrying the velocity reduction means as well as a fan 20 for removing air into the plenum 15 forming a first zone of high pressure air therein through the panel to a zone of lower pressure and the flow path described above. The table 10 is carried on suitable supports 21 on either side of the lower extension 15b of the plenum. A support 22 is provided for carrying the light fixtures 12 for providing a controlled source of heat and light for the growth chamber.

FIG. 4 best illustrates the table in the form of a grating 10. A sprinkler system includes a pipe 23 carrying nozzles 24.

The air distribution panel A is illustrated as being positioned across and beneath the table and forms a portion of the plenum 15b. The panel A may be considered as an upper wall of a plenum or in this instance, an intermediate wall dividing upper and lower portions of a single plenum.

FIG. 3 illustrates a preferred embodiment of the invention wherein the air distribution panel A is formed from a block of expanded polystyrene or other suitable lightweight construction material as may be provided, for example, through air entrainment. The tapered surfaces B are provided in the panel and have walls arranged preferably at about a 7 to 15 degree included angle. An angle in this range of divergence provides a natural expansion angle. It is believed that angles of divergence from about 5 to 25 degrees would be useful. Although the angle may be expected to vary from the ideal, the more desirable relationships may be determined from the formula and method illustrated in *Basic Fluid Mechanics*, J. Lister Robinson, 1963 at pages 48–51.

Referring to FIGS. 2 and 3, it will be observed that the opening 25 is relatively small as the conical surfaces open into the plenum and taper outwardly in an ever increasing cross section into a larger opening 26 which serves as a distribution opening. FIG. 3 illustrates a panel made of lightweight construction material. A depth of 8 inches with a cone having an opening diverging from ⅜ inches to 1¼ inches has been found to give desirable results. The edges of the inner smooth conical surfaces may be bevelled at the entrance and exit as at 25a and 26a, respectively, (FIG. 3) to minimize eddy currents or other turbulence, thus increasing the efficiency of the air flow reducing pressure drop.

Figure 5:
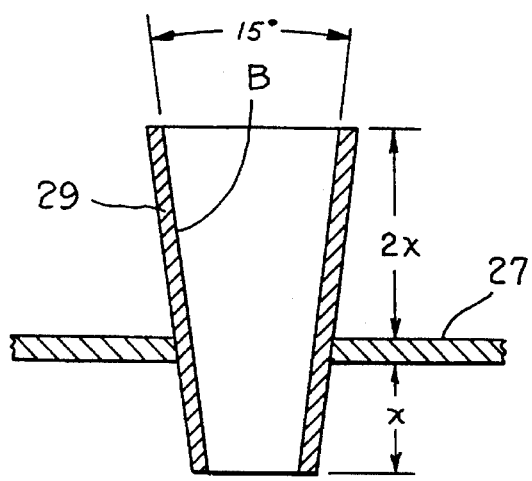
FIG. 5 is an enlarged sectional elevation taken on the line 5—5 in FIG. 4.

Referring more particularly to FIGS. 4 and 5, it will be noted that a modified form of the invention is illustrated wherein the grid of the panel A for containing the conical surfaces is supplied by a thin member rather than by a structural block member. A sheet 27 has a plurality of spaced openings 28 therein for containing conical members 29 each having a conical surface B therein. It has been found that suitable cones may be provided in the form of paper tubes of the type upon which yearn is wound to form packages by the textile industry. The cone preferably extends for about one third of its total length into the sheet 27 as illustrated in FIG. 5.

Figure 6:
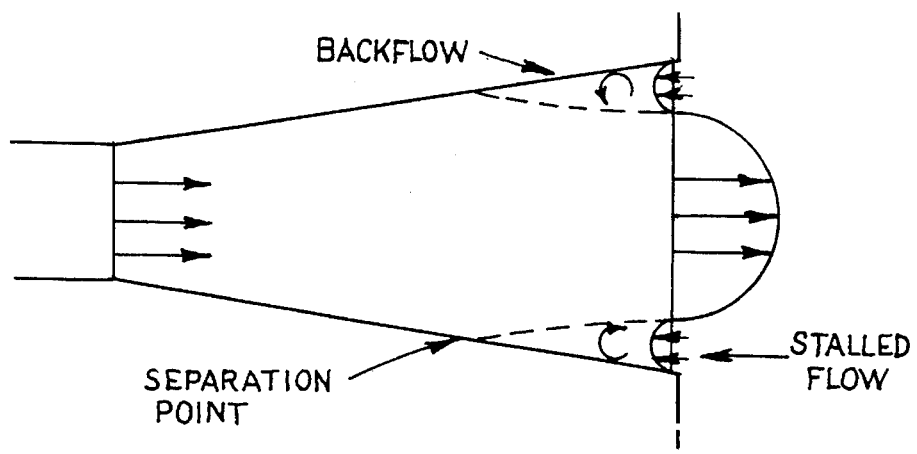
FIG. 6 is an enlarged sectional elevation similar to FIG. 5 illustrating actual air flow through a diffuser construction in accordance with the prior art.

Referring more particularly to FIG. 6 which is illustrative of the prior art as described in Fluid Flow Data Book, General Electric, August 1962, page 7, Section 405.9, in single diffusers, the optimum angle for the lowest pressure drop is stated to be between 6° and 8° total included angle. This is controlled by separation of the boundary layer at the wall of the diffuser where stalled flow is illustrated as occurring.

As pointed out in Section 405.9 at page 15 diffuser performance can be enhanced with splitters, suction or vortex generators. It has been suggested that vortex generators are capable of preventing boundary layer separation up to total included angles of between 16° to 20° with pressure recovery equal to the most efficient conical diffusers with total included angles of between 6° and 8°.

EXAMPLE

Figure 7:
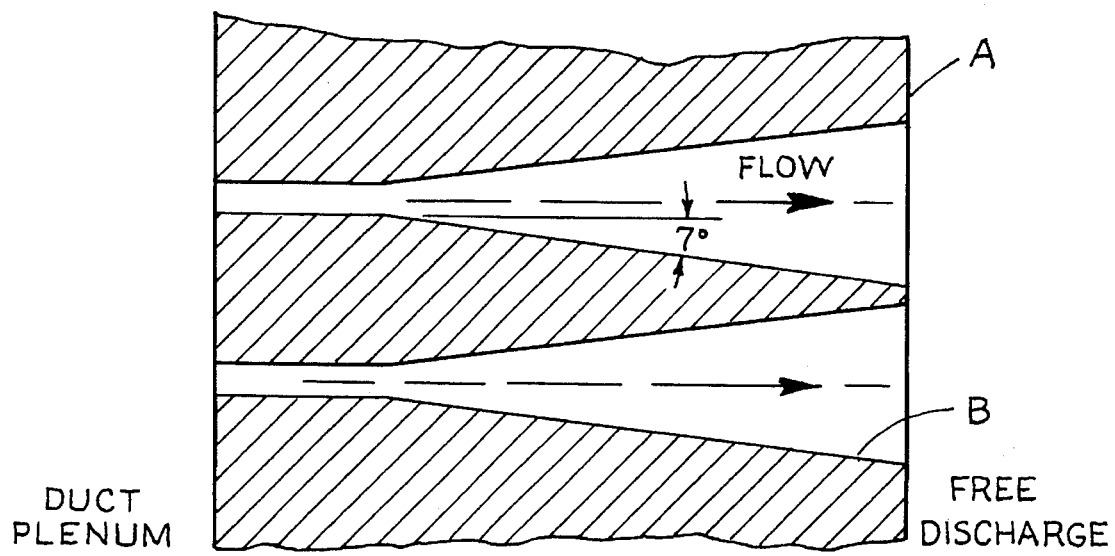
FIG. 7 is an enlarged sectional elevation illustrating an air distribution panel constructed in accordance with the invention wherein boundary layer separation and stalled air flow are substantially reduced in order to reduce or minimize pressure drop across the panel.

A fluid distribution panel is illustrated in FIG. 7 which indicates that conical openings or passageways which are closely adjacent act in a similar manner as vortex generators in connection with a single panel.

In the structure illustrated in FIG. 7, a series of air flow trials were conducted to verify the actual measured pressure drop across the fluid distribution panel A. The actual panel tested was 3' wide by 2' high by 8" thick, containing a closely packed staggered array of 215 conical passageways B extending through the panel. The air inlet section of the nozzle is not rounded and has a diameter of ⅜" and a length of 1½". The conical section defines tapering surfaces 6½" long with an inlet diameter of ⅜" and an outlet diameter of 1¾" extending therebetween. The total included angle is 14°. For testing the panel was installed in a duct plenum 3' wide by 2' high. Air flow was set to deliver a pre-selected average inlet face velocity for each test. The panel had a free discharge.

By comparing the calculated pressure drop based on the G. E. Data Book, with actual measured pressure drop, conclusions may be drawn as to performance.

| NOZZLE VELOCITY | G.E. CALCULATED PRESSURE DROP | ACTUAL MEASURED PRESSURE DROP |
| --- | --- | --- |
| 5,455 FPM | 0.96–1.15 In $H_2O$ | 0.47 In $H_2O$ |

The combination of features of the fluid distribution panel creates a synergistic effect that allows lower overall pressure for this device than would be predicted.

By thus placing the passageways in close proximity boundary layer separation is retarded by virtue of the suction between nozzles so as to retard stalled air flow. It would appear that a range of included angles capable of producing substantially reduced pressure drop may be found to be between 6° and 20°. It appears that pressure drop increases beyond a certain included angle believed to be an angle of natural expansion of about 15°.

It is thus seen that an air distribution panel has been provided containing spaced conical openings which extend generally normal to the plane of the panel. The openings diverge from an inner opening in order to provide even flow of ambient air across the entire panel. Thus, all areas of a panel may have controlled uniform flow of air substantially free of solid particles or other particulate matter. If desired, the air flow may be controlled such as to vary the air flow from area to area across the panel. This may be done by varying the size of the conical elements formed by the conical surfaces. Further control of air flow may be obtained by varying the pattern at which the conical surfaces are spaced across the panel.

While a preferred embodiment of the invention has been described using specific terms, such description is for illustrative purposes only and it is to be understood that changes and variations may be made without departing from the spirit or scope of the following claims.

What is claimed is:

1. The method of uniformly distributing air from a source of air at a first pressure to a zone of air at a lower pressure comprising the steps of:

providing a panel having spaced opposed surfaces defining open entrance ends and open exit ends respectively for passageways extending therethrough;

positioning a plurality of said passageways having spaced conical surfaces extending through said panel located between said source and said zone forming continuously open and uninterrupted conical passageways which are free of obstruction as might produce turbulence spaced across said panel;

providing an included angle of from about 6° to about 20° between opposite side portions of said conical passageways so as to form an angle of natural expansion to thereby minimize the pressure drop and reduce turbulence to provide controlled air flow through said conical passageways of said panel;

sealing spaced areas between said conical surfaces across said panel;

positioning said conical passageways for receiving air through said open entrance ends in said conical passageways expanding the volume of same during its passage through said conical surfaces tapering outwardly in an ever-increasing cross section from said open entrance to said open exit ends entering into said zone of lower pressure thereby delivering a controlled air flow through said open ends into said zone; and spacing said conical passageways in such close proximity as to substantially reduce boundary layer separation and stalled flow as a result of the effect of air flowing from adjacent passageways producing minimized pressure drop across said panel;

whereby air is distributed across said panel from said source for use in said zone of lower pressure.

2. The method set forth in claim 1 wherein said conical passageways are all of substantially the same size, each is disposed axially substantially normal to said panel, and each is spaced substantially equidistant from the other across the entire panel.

3. A structural section for controlling the distribution of air from a source of air at a first pressure to a zone of air at a lower pressure comprising:

a panel defined by a pair of spaced opposed planar surfaces one of which defines said source of air which the other defines said zone of air at a lower pressure;

a plurality of generally conical passageways spaced across the length and breadth of said panel and extending through said panel;

said conical passageways each having spaced entrance openings in said one surface in axial alignment with an exit opening in said other surface and a conical surface therebetween tapering outwardly in an ever-increasing cross section toward said exit opening defining a continuously open and uninterrupted passageway free of obstruction as might produce turbulence between said opposed openings, said openings being substantially flush with said spaced opposed planar surfaces;

said conical surfaces each consisting essentially of a surface formed in said panel having an included angle of from about 6° to about 20° between opposite side portions of said conical surface forming an angle of natural expansion which minimizes the pressure drop and reduces turbulence; and said conical passageways being positioned in such close proximity as to substantially reduce boundary layer separation and stalled flow as a result of the effect of air flowing from adjacent passageways producing minimized pressure drop across said panel;

whereby air flow through said conical passageways is characterized by controlled flow across said structural section.

4. The structure set forth in claim 3 wherein said panel is molded.

5. The structure set forth in claim 3 wherein said panel is molded of plastic foam.

6. The structure set forth in claim 3 wherein said opposed surfaces are parallel planar surfaces, and wherein said conical passageways are of substantially the same size and substantially equally spaced across said panel.

7. A structural section for controlling the distribution of air from a source of air at a first pressure to a zone of air at a lower pressure comprising:

a panel defined by a pair of spaced opposed planar surfaces one of which defines said source of air while the other defines said zone of air at a lower pressure;

a plurality of generally conical passageways spaced across the length and breadth of said panel and extending through said panel;

said conical passageways each having openings in said one surface in axial alignment with an exit opening in said other surface and a conical surface therebetween tapering outwardly in an ever-increasing cross section toward said exit opening defining a continuously open and uninterrupted passageway free of obstruction as might produce turbulence between said opposed openings;

said conical surface being defined substantially by an angle of natural expansion which minimizes the pressure drop and reduces turbulence, being from about 6° to about 20° between opposite side portions of said conical surface; and said conical passageways being positioned in such close proximity as to substantially reduce boundary layer separation and stalled flow as a result of the effect of air flowing from adjacent passageways producing minimized pressure drop across said panel;

whereby air flow through said conical passageways is characterized by less turbulence to provide a controlled flow across said structural section.

8. A structural section for controlling the distribution of air from a source of air at a first pressure to a zone of air at a lower pressure comprising:

a panel defined by spaced opposed flat surfaces one of which defines said source of air while the other defines said zone of air at a lower pressure;

a plurality of spaced tapering passageways, each of said passageways being free of obstruction as might produce turbulence extending through said panel;

said tapering passageways being spaced across the length and breadth of said panel;

said tapering passageways each having spaced entrance openings in said one surface aligned with an exit opening in said other surfaces and a surface therebetween tapering outwardly in an ever-increasing cross section toward said exit opening defining a continuously open and unobstructed passageway between said opposed openings;

said tapering surface being at an angle of natural expansion which minimizes the pressure drop and reduces turbulence having an included angle of from about 6° to about 20° between opposite side portions of said tapering surface; and said tapering passageways being positioned in such close proximity as to substantially reduce boundary layer separation and stalled flow as a result of the effect of air flowing from adjacent passageways producing minimized pressure drop across said panel;

whereby air flow through said tapering passageways is characterized by less turbulence to provide a controlled flow of air across said structural section.

9. A structural section for controlling the distribution of air from a source of air at a first pressure to a zone of air at a lower pressure comprising:

a panel having an array of openings defined by passageways between opposed opposite surfaces communicating between said source of air at a first pressure and said zone of air at a lower pressure;

substantially smooth diverging surfaces tapering outwardly between opposed opposite surfaces extending continuously at an included angle of from about 6° to about 20° defining said passageways; and respective entrance openings and exit openings defined in said opposed opposite surfaces for said passageways receiving air from said source of air through said entrance openings at a first pressure, expanding the volume thereof by passage through said passageways of ever-increasing cross section for delivery through said exit openings to said zone of lower pressure;

whereby air flow through said structural section is controlled so that turbulence with resulting pressure drop is avoided.

* * * * *